(12) United States Patent
Shudark et al.

(10) Patent No.: US 9,736,726 B2
(45) Date of Patent: Aug. 15, 2017

(54) TECHNIQUES FOR OPTIMIZING A MESH NETWORK

(71) Applicant: LANDIS+GYR INNOVATIONS, INC., Alpharetta, GA (US)

(72) Inventors: Jeffrey Shudark, Cumming, GA (US); Christopher Calvert, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 288 days.

(21) Appl. No.: 14/627,356

(22) Filed: Feb. 20, 2015

(65) Prior Publication Data

US 2015/0245248 A1 Aug. 27, 2015

Related U.S. Application Data

(60) Provisional application No. 61/943,204, filed on Feb. 21, 2014.

(51) Int. Cl.
*H04L 1/00* (2006.01)
*H04L 12/26* (2006.01)
(Continued)

(52) U.S. Cl.
CPC ............. *H04W 28/08* (2013.01); *H04L 45/02* (2013.01); *H04L 45/12* (2013.01); *H04L 45/48* (2013.01);
(Continued)

(58) Field of Classification Search
CPC ... H04W 40/244; H04W 40/02; H04W 28/08; H04W 72/0486; H04W 24/02;
(Continued)

(56) References Cited

U.S. PATENT DOCUMENTS

2005/0207376 A1* 9/2005 Ashwood-Smith ..... H04L 45/20 370/338
2009/0138617 A1* 5/2009 Veillette ................. G01D 4/004 709/238

FOREIGN PATENT DOCUMENTS

WO 2015127197 8/2015

OTHER PUBLICATIONS

Kang et al., "Time Slotted, Channel Hopping MAC (TSCH)", IEEE P802.15 Working Group for Wireless Personal Area Networks (WPANs), Jul. 2008, 33 pages.
(Continued)

*Primary Examiner* — Yemane Mesfin
*Assistant Examiner* — Abdelillah Elmejjarmi
(74) *Attorney, Agent, or Firm* — Kilpatrick Townsend & Stockton LLP

(57) ABSTRACT

A node receives status data associated with a current collector in the network, where the node is active on the current collector. The node also receives status data associated with a candidate collector in the network, where the node is not active on the candidate collector. An analysis of the status data of the collectors is generated, where the analysis includes at least comparing respective network loads reported in the received status data. An optimal collector is determined from among the current collector and the candidate collector. The determination of the optimal collector is based at least in part upon the analysis of the status data of the collectors. The node remains active on the current collector when the current collector is determined to be the optimal collector, and the node becomes active on the candidate collector when the candidate collector is determined to be the optimal collector.

15 Claims, 5 Drawing Sheets

(51) Int. Cl.
  *H04W 28/08*   (2009.01)
  *H04W 24/02*   (2009.01)
  *H04W 40/24*   (2009.01)
  *H04W 72/04*   (2009.01)
  *H04W 40/02*   (2009.01)
  *H04W 40/32*   (2009.01)
  *H04L 12/751*  (2013.01)
  *H04L 12/721*  (2013.01)
  *H04L 12/753*  (2013.01)
  *H04L 12/803*  (2013.01)
  *H04W 84/18*   (2009.01)

(52) U.S. Cl.
  CPC .......... *H04L 47/125* (2013.01); *H04W 24/02* (2013.01); *H04W 40/02* (2013.01); *H04W 40/244* (2013.01); *H04W 40/32* (2013.01); *H04W 72/0406* (2013.01); *H04W 72/0486* (2013.01); *H04W 84/18* (2013.01)

(58) Field of Classification Search
  CPC . H04W 40/32; H04W 84/18; H04W 72/0406; H04L 47/125; H04L 45/48; H04L 45/12; H04L 45/02
  See application file for complete search history.

(56) References Cited

OTHER PUBLICATIONS

Kulkarni et al., "Tree Balancing in Smart Grid Advanced Metering Infrastructure Mesh Networks", Green Computing and Communications (GREENCOM), 2012 IEEE International Conference, Nov. 20, 2012, pp. 109-115, 7 pages.

PCT/US2015/016808, "International Search Report and Written Opinion", May 28, 2015, 13 pages.

Yu et al., "Activating the Hot Spot Problem by Switching Multiple Sinks in Wireless Sensor", Fifth International Conference on Mobile Ad-hoc and Sensor Networks, Dec. 19, 2009, pp. 204-211, 8 pages.

* cited by examiner

TECHNIQUES FOR OPTIMIZING A MESH NETWORK

CROSS-REFERENCE TO RELATED APPLICATIONS

This application claims priority to U.S. Provisional Application No. 61/943,204 entitled "LOAD BALANCING AND BACKGROUND SCANNING IN A TIME SYNCHRONIZED CHANNEL HOPPING NETWORK" filed Feb. 21, 2014, which is incorporated herein by reference for all purposes.

BACKGROUND

There are a number of scenarios that can lead to a node in a mesh network being connected to a collector or other central node device that is not the best choice. This can happen naturally, such as when the node finds the sub-optimal collector first. It can happen artificially, such as when a new collector is installed or returns from an outage state. Additionally, collectors can only support a limited number of nodes so the addition of new nodes to the network may impact collector selection for both the new nodes and the existing nodes. For these reasons, nodes need to have the ability to determine if there are "better" performing collectors available to be joined in order to optimize the network layout.

SUMMARY

Various aspects of the present invention relate to a node optimizing a network by selecting an optimal collector based on an evaluation of the current and candidate collectors. In one implementation, the node receives status data associated with a current collector in the network, where the node is active on the current collector. The network may be a time synchronous channel hopping (TSCH) network, such as defined by IEEE 802.15.4e. The node also receives status data associated with a candidate collector in the network, where the node is not active on the candidate collector. The status data associated with the collectors may be implemented as beacon messages in a TSCH network.

An analysis of the status data of the collectors is generated, where the analysis includes at least comparing respective network loads reported in the received status data. The analysis may further include comparing rank indicators in the status data, a number of child nodes of the node, a length of time the node has been active on the current collector, a margin of improvement held by the candidate collector over the current collector, and/or other factors. An optimal collector is determined from among the current collector and the candidate collector, based at least in part upon the analysis of the status data of the collectors. The node remains active on the current collector when the current collector is determined to be the optimal collector, and the node becomes active on the candidate collector when the candidate collector is determined to be the optimal collector.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
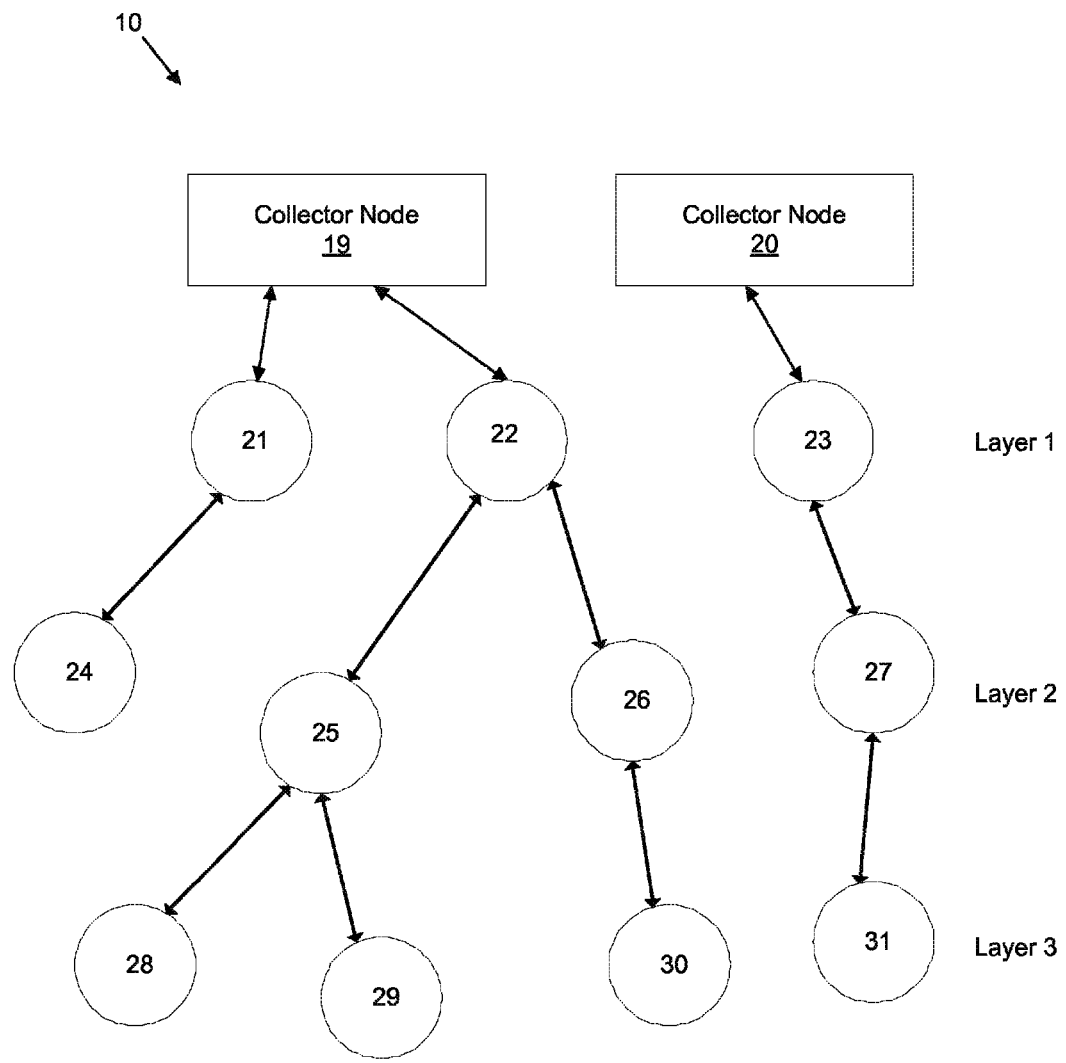
FIGS. 1-3 are drawings of exemplary mesh networks according to various aspects of the present disclosure.

The present invention is directed to systems and methods for scanning a network for a candidate collector and evaluating the candidate collector to determine whether a node should remain connected to its current collector or move to the candidate collector. The node considers factors including, but not limited to, its rank or logical distance from each collector, its children, and the load of each collector.

As defined herein, a "node" includes an intelligent device capable of performing functions related to distributing messages in a mesh network. In one system, a node can be a meter located at a facility, such as a house or apartment, that measures the consumption of a resource such as gas, water, or electric power. Such a meter can be part of an advanced metering infrastructure (AMI), radio frequency (RF) network. Other examples of nodes include a router, collector or collection point, host computer, hub, or other electronic device that is attached to a network and is capable of sending, receiving, or forwarding information over a communications channel.

A node can contain several components that enable it to function within implementations of the present invention. For example, a node can include a radio that can enable it to communicate with like nodes and/or other devices in the mesh network. The radio of each node may have a programmable logic controller (PLC)-like device that can enable the radio to function like a computer, carrying out computer and command functions to provide implementations of the present invention described herein. A node may also include a storage medium for storing information related to communication with other nodes. Such storage mediums can include a memory, a floppy disk, CD-ROM, DVD, or other storage devices located internal to the node or accessible by the node via a network, for example. A node may also include a crystal oscillator (i.e. a clock) to provide timekeeping and a battery to provide back-up power. Some nodes may be powered only by a battery.

A node can communicate with other nodes in the mesh network over various frequency channels. Nodes that share the same frequency hopping sequence, i.e., hop between frequencies at the same time, can communicate with each other over the same frequency. Thus, in a TSCH network, nodes can hop at different times to establish communication with other nodes over the available frequency spectrum, e.g., 7 channels according to exemplary implementations. A node can hop according to a certain time increment or dwell time, e.g., 700 milliseconds, at which time the node can transmit or receive a message over a given channel or frequency. As described herein, the hopping sequence length used should be a multiple of the number of channels in order to promote some overlap in hopping sequences. For example, if there are 7 channels, then the hopping sequence length should be a multiple of 7, such as 21, so that there are 21 slots in the hopping sequence. This will provide a better chance that some overlap occurs in the hopping sequence of geographically close collectors, while still providing randomization for non-interference.

As used herein, a "parent node" refers to a node which may be used by another node for sending information to a destination and for receiving messages. As each node acquires or identifies other nodes with which it can communicate (commonly referred to as neighboring nodes), information and performance metrics about these nodes is obtained to facilitate communication. Nodes can use the metrics to score each of the nodes they identified to determine which identified node provides the best option for sending information to a destination and for receiving messages, i.e., a parent node. A node that has identified a parent node may be synonymously be referred to as a child node of the parent node.

As used herein, a "collector node" refers to a node used to route messages within the network, as well as between the network and other networks. For example, a collector node may route messages within a wireless mesh network that includes a number of meters and a fiber optic network that includes a headend system or control center. A given network may contain one or more collector nodes, where each collector node establishes a personal area network (PAN). The various PANs collectively make up the network. A node may be referred to as "active" on or "associated" with a given collector when the node is part of the PAN of the collector.

As used herein, "status data" refers to information communicated in a message or sequence of messages from which a node may obtain network status information associated with a given collector. The status data may be received by the node either directly from a collector or through one or more intervening nodes. In some implementations of a network defined by IEEE 802.15.4e, the status data may be carried by a beacon. The beacon may be transmitted on a schedule-driven and/or event-driven basis.

Referring now to the drawings, FIG. 1 depicts an exemplary mesh network 10 configured to implement systems described herein. The mesh network 10 can include collector nodes 19-20 and radio nodes 21-31. The collector nodes 19-20 can serve as a collection point to which the nodes 21-31 may send information, such as measurements of the consumption of gas, water, or electric power at a facility associated with the node. Nodes 21-31, as previously discussed, can have sufficient networking and computing capability to communicate with other nodes in the mesh network and to make intelligent determinations to facilitate such communication. The collector nodes 19-20 can be configured to have at least the same functionality and capabilities present in nodes 21-31. Additionally, the collector nodes 19-20 may include sufficient storage capability for storing information from nodes 21-31 and, in some examples, greater computing capability to process the information received from the nodes. In other examples, a control center or other computing device (not shown) can be used to process the information received from the nodes.

Three layers of nodes in the mesh network 10 are shown in FIG. 1 (layer 1, layer 2, and layer 3). Fewer or more layers may exist in other configurations. Nodes can be associated with a particular layer based on certain factors, such as a node's logical distance to its collector node and the reliability of its data transmissions. The factors and/or the weights given to the factors may vary with different networks. Nodes located on layer 1 indicate that they have a "better" connection to a collector node, and do not require the use of an intervening node to communicate with the collector node. Nodes located on higher numbered layers communicate with the collector nodes 19-20 through at least one intervening node. For example, nodes located on layer 2 are child nodes to a layer 1 parent node, and nodes located on layer 3 are child nodes to a layer 2 parent node (i.e. here, layer 2 nodes can serve both parent and child roles in different node pairings). Thus, a layer 3 node communicates with one of the collector nodes 19-20 through its parent layer 2 node, which in turn communicates with its parent layer 1 node, which communicates with the collector. While FIG. 1 shows layer 1 nodes being closer to the collector nodes 19-20 than layer 2 nodes, and layer 2 nodes closer than layer 3 nodes, the layers may not be determined solely by physical distance. A layer 1 node may be located further away from the collector nodes 19-20 than a layer 2 node, depending upon the manner in which the nodes are evaluated.

As described previously, there are a number of scenarios that can lead to a node 21-31 being connected to a collector node 19-20 that is not an optimal choice. For example, node 22 may have identified collector node 19 prior to discovering a "better" choice, collector node 20. Additionally, conditions in the network 10 may change over time, such as new nodes being added, such that what was once an optimal collector node is no longer the optimal choice. For these and other possible reasons, it is necessary for nodes 21-31 to have the ability to determine if there are other collector nodes available that would result in improved performance for the node.

Using the techniques disclosed herein, each of the nodes 21-31 may determine their optimal collector node 19-20 and periodically verify that the currently selected collector node remains the optimal choice, thereby improving performance for each of the nodes 21-31. As a result, performance and efficiency of the mesh network 10 may be improved.

Figure 2:
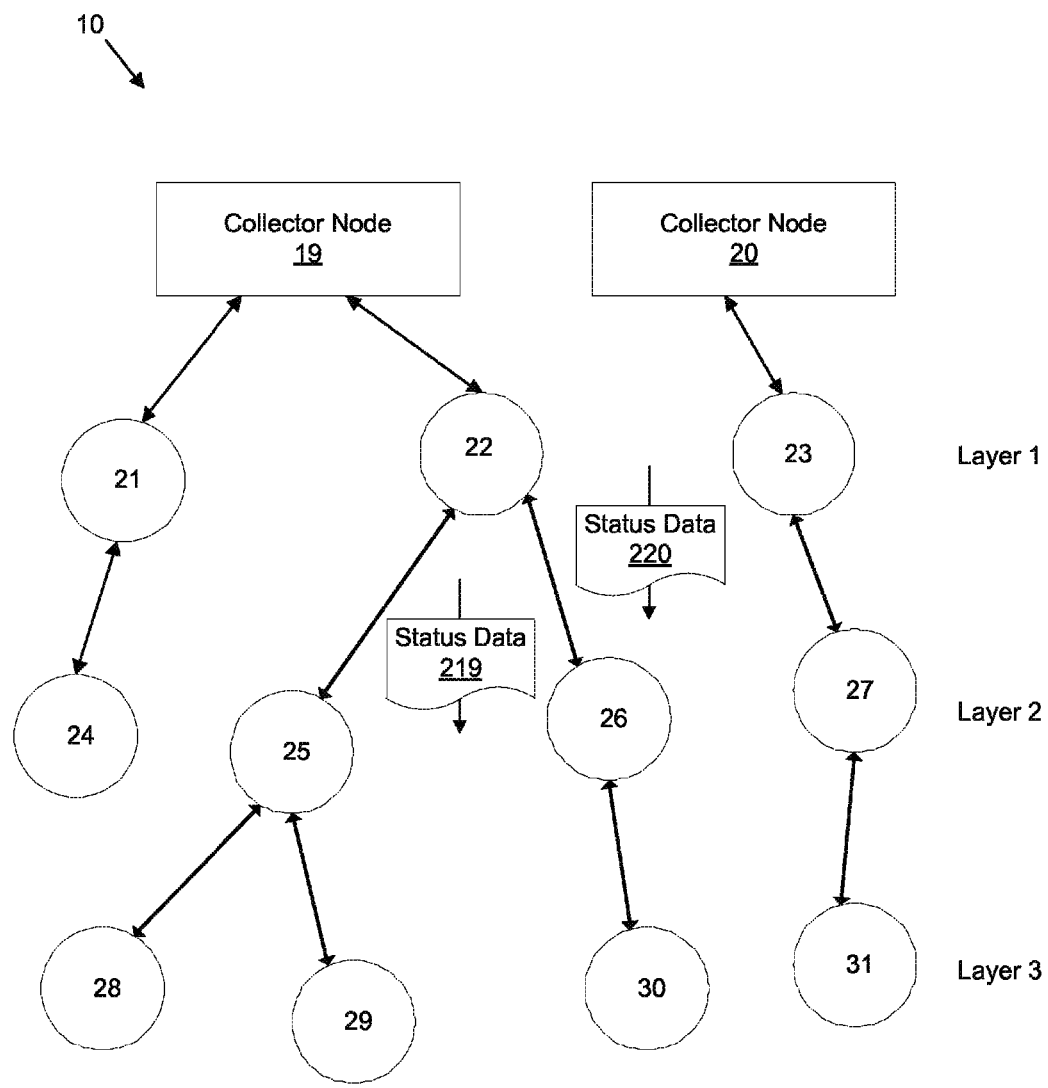

To this end, FIG. 2 presents another illustrative example of a network 10 including status data 219-220 with which the nodes 21-31 may compare collector nodes 19-20 in order to select an optimal collector node. The nodes periodically send status data to the network to maintain synchronization. One example of this status data is a beacon or enhanced beacon. For example, a node, such as node 26, receives status data 219 from a node, such as a parent node 22, in a personal area network (PAN) associated with its current collector 19 and may also receive status data 220 from a node in a PAN associated with candidate collector 20. The node 26 uses the information in the status data to determine whether it should switch from a PAN associated with collector 19 to a PAN associated with collector 20.

The information in the status data 219-220 may include: a (1) PAN identifier (ID); (2) network ID; (3) signature; (4) rank indicator; (5) network load indicator; and/or other status information as can be appreciated. The "PAN ID" identifies the PAN of the node sending the status data. The "network ID" identifies the network. For example, if the nodes are utility meters, the network ID may identify a utility or other resource provider. The "signature" is data that allows a node to verify the legitimacy of the status data. For example, the signature may be a digital signature or other data that may be verified through use of a public key or shared key cryptographic operations. The "rank indicator" (RI) is a value indicating a layer of the sending node or logical distance it is from its collector node. The "network load indicator" (NLI) is a value representing the relative load of the collector.

For example, if the status data is implemented as a beacon in a TSCH network, the data elements for PAN ID, network ID, and signature are typically defined by the applicable network protocol, whereas the data elements for RI and NLI may not be defined. If the data elements for RI and NLI are not defined, then they may be included in an unspecified information element (IE) in the beacon.

Referring back to FIG. 2, the PAN ID for the status data 219 from a node connected to collector 19 is different than the PAN ID for the status data 220 from a node connected to collector 20, but the network ID for the collectors 19-20 are the same since they are part of the same network 10. The RI is a value which is mapped in the following way by the source of the status data with respect to its position in the Destination Oriented Directed Acyclic Graph (DODAG) of the mesh network 10. In one implementation, the RI is an integer value from 0 to 7 that is defined as follows:

$$\text{Rank Indicator}=\text{minimum}[7,(\text{Rank}/(2\times\text{MinRankIncrease}+1))]$$

In this implementation, the Rank values are:
0—Collector or 1 hop from Collector
1—2 or 3 hops from Collector
2—4 or 5 hops from Collector
3—6 or 7 hops from Collector
4—8 or 9 hops from Collector
5—10 or 11 hops from Collector
6—12 or 13 hops from Collector
7—14+ hops from the Collector The MinRankIncrease is defined by the respective collector.

In one implementation, the NLI is a value from 0 to 8 specified as:
0—Collector load normal or below normal (<25% of total capacity)
2—Collector load normal-high (between 25% and 50%)
5—Collector load heavy (between 50% and 75%)
8—Collector load over maximum (>75%)

As can be appreciated, values other than those shown above may be used in other implementations. The NLI values are carried forward in the status data 219-220 from the nodes 21-31, while the RI values may be updated by a node forwarding the status data 219-220. In general, a given node that is on a normally loaded collector 19-20 should not switch to a different collector unless there is a significant improvement in rank, since it would be better to remain on the current collector and not impact the child nodes of the given node.

Next, an exemplary illustration is provided of the network optimization operations that may be implemented in the nodes 21-31 of the network 10. For purposes of this illustration, the operations that may be carried out in node 26 will be described, though it is understood that similar operations may be carried out in any of the nodes 21-31. To begin, node 26 may receive status data 219 from a node 22 connected to the collector 19. At the time the status data 219 is received, the node 26 may already be an active node of the PAN of the collector 19, or the node 26 may join the PAN of the collector 19 based upon the status data 219 being an optimal choice among any alternate collector nodes detected by the node 26.

Thereafter, the node 26 may receive status data 220 associated with a collector 20, where the status data 220 is received either directly from the collector 20 or through one or more intervening nodes. A collector other than the collector with which a node is presently associated may be referred to herein as a "candidate collector." The node 26 may recognize that the status data 220 is associated with a candidate collector (rather than its current collector) based upon the PAN ID of the status data 220 being different than the PAN ID of the status data 219 associated with the collector 19. The node 26 also verifies that the network ID of the status data 220 is the same as the network ID used by the status data 219 in order to verify that the candidate and current collectors both participate in the same network. For example, for nodes that are utility meters, one network ID may be used to represent electricity meters, while another network ID is used for gas meters. Within each of these networks, various PANs may exist, each PAN orchestrated by a collector.

Returning to FIG. 2, in some implementations, the node 26 may also verify the signature of the status data 219-220 in order to verify the authenticity of the status data 219-220. The signature verification may be carried out using digital signatures, public keys, shared keys, cryptographic hashing, and/or other authentication mechanisms as can be appreciated. Thereafter, the node 26 compares various factors reported in the respective status data 219-220 in order to determines an optimal collector from among the current collector and candidate collector. The factors that may be compared include (1) the NLI, (2) the RI, (3) the number of children of the node 26, (4) the length of time the node 26 has been in the PAN of the current collector (i.e. collector 19), and/or other possible factors.

Figure 3:
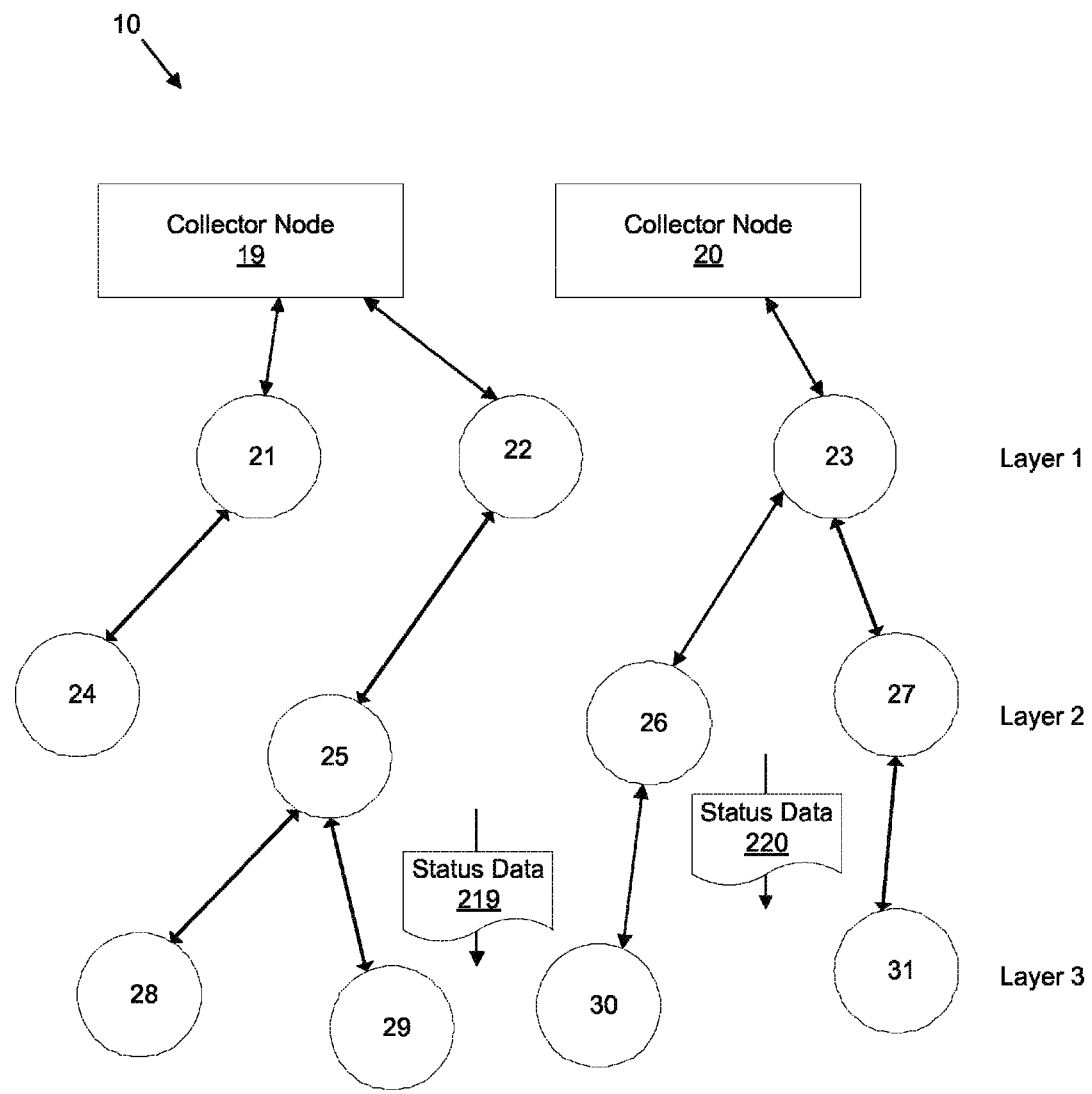

For example, the status data 219 associated with the current collector 19 may report an NLI value of '8' representing a network load of more than 75% of maximum capacity. The status data 220 associated with the candidate collector 20 may report an NLI value of '2' representing a network load of 25%-50% of maximum capacity. In some implementations, such a vast improvement in the NLI for the candidate collector 20 versus the current collector 19 may be sufficient to determine the candidate collector 20 as the optimal collector without consideration of other factors. In FIG. 3, an exemplary illustration is shown of the resulting network 10 after the node 26 becomes a child node to node 23 and part of the PAN of collector 20. As a result of the change, the node 30, a child node to node 26, also becomes active on the collector 20.

Continuing with another example at a later point in time using FIG. 3, if the now current collector 20 reported an NLI value of '5', while the candidate collector 19 reported an NLI value of '2', the node 26 may also consider other factors, such as RI, before determining the optimal collector. In this example, the node 26 may evaluate both factors, the RI and NLI, by adding the RI and NLI values reported in the respective status data 219-220, then seeing the extent of the difference in the added values, where lower values are preferred.

Here, if node 26 received the status data 219 from node 25, the RI value would be '1' since node 25 is two hops from the collector 19. If node 26 received the status data 220 from node 23, the RI value would be '0' since node 23 is one hop from the collector 20. Thus, the NLI+RI value for the current collector is '5', while the NLI+RI value for the candidate collector 19 is '3.' If the difference between the two NLI+RI values (i.e. 5−3=2) meets a minimum margin of improvement, then the candidate collector 19 may now be determined to be the optimal collector. Alternatively, if the minimum margin of improvement is not met, the node 26 will remain active on the current collector 20. The minimum margin of improvement may be considered another factor which represents the cost of the disruption to the node 26 and its child node 30 that would result from a change to the collector 19.

Figure 4:
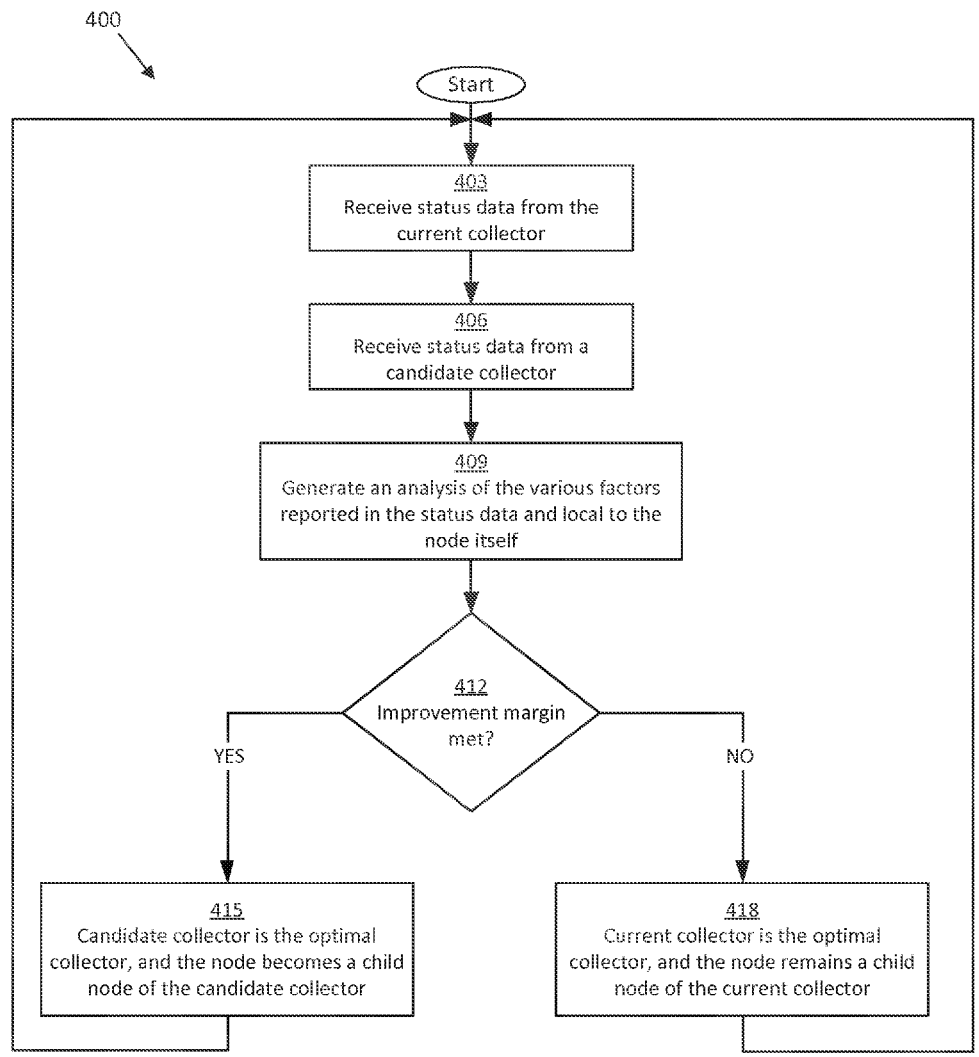
FIG. 4 is a flowchart illustrating one example of functionality implemented by a node in the mesh network of FIG. 1 according to various aspects of the present disclosure.

Referring next to FIG. 4, shown is a flowchart that provides one example of the network optimization operations for a method 400 of a node 21-31 in the mesh network 10 according to various aspects. It is understood that the flowchart of FIG. 4 provides merely an example of the many different types of functional arrangements that may be employed to implement the network optimization operations of the method 400 as described herein. The exemplary operations depicted in the flowchart of FIG. 4 are initiated by a node 21-31 in the mesh network 10 after the node has previously become active in a PAN of a collector.

Beginning with block 403, a node 21-31 may receive status data associated with its current collector, either directly or through one or more intervening nodes. The information in the status data may include: a (1) PAN ID, (2) network ID, (3) signature, (4) RI, (5) NLI, and/or other status information as can be appreciated.

Next, in block 406, the node may receive status data associated with a candidate collector that is different than its current collector, where the status data may be received directly from the candidate collector or through one or more intervening nodes. The node may recognize that the status data is from a candidate collector (rather than its current collector) based upon the PAN ID of the status data being different than the PAN ID of the status data used by its current collector. The node may also verify that the network ID of the status data received from the candidate collector is the same as the network ID used by the status data of the current collector in order to verify that the candidate and current collectors both participate in the same network. In some aspects, the node may also verify the signature of the status data in order to verify the authenticity of the received status data. The signature verification may be carried out using digital signatures, public keys, shared keys, cryptographic hashing, and/or other authentication mechanisms as can be appreciated.

Then, in block 409, the node generates an analysis of the respective collectors based on various factors that may be reported in the status data, as well as local to the node itself. The factors that may be analyzed include (1) the NLI, (2) the RI, (3) the number of children of the node, (4) the length of time the node has been in the PAN of the current collector, (5) minimum margin of improvement, and/or other possible factors.

While it may be necessary for the candidate collector to show improvement over the current collector with regard to one or more factors, such as a lower NLI value, in order to be selected as the optimal collector, that alone may not be sufficient. In block 412, the node considers the margin of improvement that may be demonstrated by the current collector. For example, in one possible implementation, the node may consider the following groups of factors:

1) Decrease of 5 or more in combined values of (RI+NLI) AND the candidate collector has a NLI <5.
2) (Current Collector NLI >=5) AND (Candidate Collector NLI <5)
3) (Child count <=3 AND 8 hours has passed since active on this Collector)
   OR
   (Child count <=10 AND 16 hours has passed since active on this Collector)
   OR
   (Child count >10 children AND Decrease of 8 or more in combined RI and NLI)
4) (Current Collector NLI=8 AND Candidate Collector NLI <5)

In this example, the node may determine a candidate collector to be the optimal collector if factor groups (1 AND 3), (2 AND 3), or (4) are true. Here, the factor groups specify various rules that intrinsically consider a minimum margin of improvement, such as a "Decrease of 5 or more in combined values of (RI+NLI)."

If the factors considered by the node show a minimum margin of improvement with the candidate collector, then, in block 415, the candidate collector is the optimal collector and the node becomes active on the candidate collector. Alternatively, if the factors considered by the node show do not show at least the minimum margin of improvement with the candidate collector, then, in block 418, the current collector is the optimal collector and the node remains active on the current collector. Thereafter, execution of the method 400 in the node 21-31 returns to block 403 where the network optimization operations may later re-evaluate the neighboring collectors.

Figure 5:
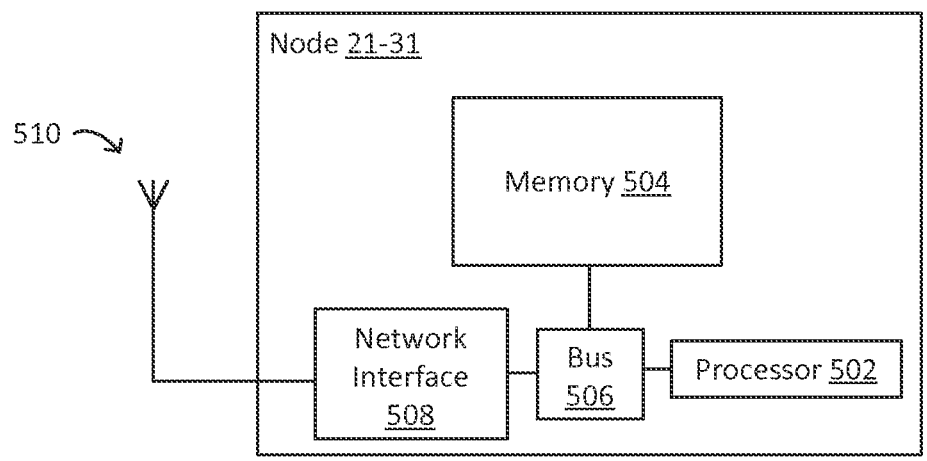
FIG. 5 is a schematic block diagram that provides one example illustration of a node employed in the mesh network of FIG. 1 according to various aspects of the present disclosure.

Next, in FIG. 5, shown is a block diagram depicting an example of a node 21-31 used for implementing the techniques disclosed herein within a wireless mesh network or other data network. The node 21-31 can include a processing device 502. Non-limiting examples of the processing device 502 include a microprocessor, an application-specific integrated circuit ("ASIC"), a state machine, or other suitable processing device. The processing device 502 can include any number of processing devices, including one. The processing device 502 can be communicatively coupled to computer-readable media, such as memory device 504. The processing device 502 can execute computer-executable program instructions and/or access information respectively stored in the memory device 504.

The memory device 504 can store instructions that, when executed by the processing device 502, cause the processing device 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The nodes 21-31 can include a bus 506 that can communicatively couple one or more components of the node 21-31. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in a node 21-31 to store and execute programming code.

The nodes 21-31 can also include network interface device 508. The network interface device 508 can be a transceiving device configured to establish one or more wireless communication links via an antenna 510. A non-limiting example of the network interface device 508 is an RF transceiver and can include one or more components for establishing a communication link to other nodes 21-31 in the mesh network 10.

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for optimizing network performance by a processor of a node in a network, comprising:
   receiving a beacon associated with a current collector in the network, wherein the node is active on the current collector and the beacon associated with the current collector includes a network load indicator and a rank indicator for the current collector;
   receiving a beacon associated with a candidate collector in the network, wherein the node is not active on the candidate collector and the beacon associated with the candidate collector includes a network load indicator and a rank indicator for the candidate collector;
   generating an analysis of the beacons, the analysis comprising:
      analyzing the respective network load indicators and the rank indicators reported in the beacons to determine whether a first factor is satisfied;
      determining that the first factor is satisfied when (i) the network load indicator for the candidate collector is within a predetermined network load threshold and the network load indicator for the current collector exceeds the predetermined network load threshold, or (ii) the network load indicator for the candidate collector is within the predetermined network load threshold and a difference between a sum of the network load indicator and the rank indicator for the current collector and a sum of the network load indicator and the rank indicator for the candidate collector exceeds a first predetermined difference threshold;
      analyzing a number of child nodes of the node to determine whether a second factor is satisfied;
      determining that the second factor is satisfied when (i) the number of child nodes of the node is within a first child node threshold and an activity level of the node on the current collector exceeds a first activity threshold, or (ii) the number of child nodes of the node exceeds a second child node threshold and the difference between the sum of the network load indicator and the rank indicator for the current collector and the sum of the network load indicator and the rank indicator for the candidate collector exceeds a second predetermined difference threshold;
   wherein the node becomes active on the candidate collector when both the first factor and the second factor are satisfied, otherwise the node remains active on the current collector.

2. The method of claim 1, wherein the activity level of the node on the current collector is based upon a length of time that the node has been active on the current collector.

3. The method of claim 1, wherein the beacon associated with the current collector includes a PAN identifier and the beacon associated with the candidate collector includes a PAN identifier, further comprising:
   prior to analyzing the respective network load indicators and the rank indicators, comparing respective PAN identifiers; and when the PAN identifier for the current collector matches the PAN identifier for the candidate collector, then remaining on the current collector without further analysis.

4. The method of claim 1, wherein the beacon associated with the current collector includes a network identifier and the beacon associated with the candidate collector includes a network identifier, further comprising:
prior to analyzing the respective network load indicators and the rank indicators, comparing respective PAN identifiers; and
when the network identifier for the current collector differs from the network identifier for the candidate collector, then remaining on the current collector without further analysis.

5. The method of claim 1, further comprising:
forwarding the beacon associated with the current collector; and
forwarding the beacon associated with the candidate collector.

6. The method of claim 1, wherein status data in the beacon associated with the current collector includes the network load indicator and the rank indicator, further comprising:
prior to generating analysis of the beacons, verifying a signature of the status data.

7. A non-transitory computer-readable medium embodying a program for optimizing a network, the program executable by a processor of a node in the network, wherein the program comprises:
code that receives status data associated with a current collector in the network, wherein the node is active on the current collector and the status data includes a network load indicator and a rank indicator for the current collector;
code that receives status data associated with a candidate collector in the network, wherein the node is not active on the candidate collector and the status data includes a network load indicator and a rank indicator for the candidate collector;
code that generates an analysis of the status data associated with the collectors, the analysis comprising:
analyzing the respective network load indicators and rank indicators reported in the status data to determine whether a first factor is satisfied, wherein analyzing the respective network load indicators and rank indicators includes comparing the network load indicator for the candidate collector to a predetermined network load threshold;
analyzing a number of child nodes of the node to determine whether a second factor is satisfied;
determining that the second factor is satisfied when (i) the number of child nodes of the node is within a first child node threshold and an activity level of the node on the current collector exceeds a first activity threshold, or (ii) the number of child nodes of the node exceeds a second child node threshold and a difference between a sum of the network load indicator and the rank indicator for the current collector and a sum of the network load indicator and the rank indicator for the candidate collector exceeds a second predetermined difference threshold;
wherein the node becomes active on the candidate collector when both the first factor and the second factor are satisfied, otherwise the node remains active on the current collector.

8. The non-transitory computer-readable medium of claim 7, wherein the analysis further comprises:
determining that the first factor is satisfied when (i) the network load indicator for the candidate collector is within the predetermined network load threshold and the network load indicator for the current collector exceeds the predetermined network load threshold, or (ii) the network load indicator for the candidate collector is within the predetermined network load threshold and the difference between the sum of the network load indicator and the rank indicator for the current collector and the sum of the network load indicator and the rank indicator for the candidate collector exceeds a first predetermined difference threshold.

9. The non-transitory computer-readable medium of claim 7, wherein the network is a time synchronous channel hopping (TSCH) network.

10. The non-transitory computer-readable medium of claim 7, wherein the activity level of the node on the current collector is based on a length of time that the node has been active on the current collector.

11. A node, comprising:
a processor; a network interface for communicating on a network and configured to:
receive a beacon associated with a current collector in the network, wherein the node is active on the current collector and the beacon associated with the current collector includes a network load indicator and a rank indicator for the current collector; and
receive a beacon associated with a candidate collector in the network, wherein the node is not active on the candidate collector and the beacon associated with the candidate collector includes a network load indicator and a rank indicator for the candidate collector; and
a memory configured by a network optimization application executed in the node, the network optimization application causing the node to generate an analysis of the beacons, the analysis comprising:
analyzing the respective network load indicators and rank indicators reported in the beacons to determine that a first factor is satisfied, wherein analyzing the respective network load indicators and rank indicators includes comparing the network load indicator for the candidate collector to a predetermined network load threshold;
analyzing a number of child nodes of the node to determine whether a second factor is satisfied;
determining that the second factor is satisfied when (i) the number of child nodes of the node is within a first child node threshold and an activity level of the node on the current collector exceeds a first activity threshold, or (ii) the number of child nodes of the node exceeds a second child node threshold and a difference between a sum of the network load indicator and the rank indicator for the current collector and a sum of the network load indicator and the rank indicator for the candidate collector exceeds a second predetermined difference threshold;
wherein the node becomes active on the candidate collector when both the first factor and the second factor are satisfied, otherwise the node remains active on the current collector.

12. The node of claim 11, wherein the analysis further comprises:
determining that the first factor is satisfied when (i) the network load indicator for the candidate collector is within the predetermined network load threshold and the network load indicator for the current collector exceeds the predetermined network load threshold, or (ii) the network load indicator for the candidate collector is within the predetermined network load threshold and the difference between the sum of the network load indicator and the rank indicator for the current collector and the sum of the network load indicator and the rank indicator for the candidate collector exceeds a first predetermined difference threshold.

13. The node of claim 11, wherein the network is defined by Institute of Electrical and Electronics Engineers (IEEE) 802.15.4.

14. The node of claim 11, wherein the activity level of the node on the current collector is based upon a length of time that the node has been active on the current collector.

15. The node of claim 11, wherein the first child node threshold is three, the first activity threshold is eight hours, the second child node threshold is ten, and the second predetermined difference threshold is eight.

* * * * *